US010318236B1

United States Patent
Pal et al.

(10) Patent No.: US 10,318,236 B1
(45) Date of Patent: Jun. 11, 2019

(54) REFINING MEDIA PLAYBACK

(71) Applicant: Amazon Technologies, Inc., Reno, NV (US)

(72) Inventors: Rickesh Pal, San Francisco, CA (US); Kintan Dilipkumar Brahmbhatt, San Francisco, CA (US); Brandon Scott Durham, Seattle, WA (US); Jonathan Barnett Feinstein, Sebastopol, CA (US); Yun Suk Paik, Sunnyvale, CA (US); Daniel Paul Ryan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 15/147,191

(22) Filed: May 5, 2016

(51) Int. Cl.
*G06F 17/00* (2019.01)
*G06F 3/16* (2006.01)
*G06F 17/27* (2006.01)
*G06F 17/28* (2006.01)
*G10L 15/26* (2006.01)
*G10L 15/22* (2006.01)

(52) U.S. Cl.
CPC .......... *G06F 3/167* (2013.01); *G06F 17/2785* (2013.01); *G06F 17/28* (2013.01); *G10L 15/26* (2013.01); *G10L 2015/223* (2013.01)

(58) Field of Classification Search
CPC ...... G06F 3/167; G06F 17/2785; G06F 17/28; G06F 17/30758; G06F 17/30772; G10L 15/26; G10L 2015/223
See application file for complete search history.

(56) References Cited

U.S. PATENT DOCUMENTS

2009/0076821 A1* 3/2009 Brenner ............ G06F 17/30053
704/260
2011/0238779 A1* 9/2011 Little ..................... G06Q 30/02
709/217

(Continued)

*Primary Examiner* — Fan S Tsang
*Assistant Examiner* — David Siegel
(74) *Attorney, Agent, or Firm* — Hogan Lovells US, LLP

(57) ABSTRACT

Approaches provide for using a voice communications device to control, refine, or otherwise manage the playback of media content in response to a spoken instruction. For example, the voice communications device can receive a request to refine and/or initiate the playback of media content, such as music, news, audio books, audio broadcasts, and other such content. Audio input data that includes the request can be received by the voice communications device and an application executing on the voice communications device or otherwise in communication with the voice communications device can analyze the audio input data to determine how to carry out the request. The application can determine whether there is an active play queue of media content configured to play using the voice communications device. In the situation where there is no media content being played using the voice communications device, the application can determine media content using information in the request. In the situation where there is an active play queue of media content, the information can be used to refine the play queue. Thereafter, the application can cause the media content associated with the active play queue to play using the voice-enable communications device.

20 Claims, 7 Drawing Sheets

(56) References Cited

U.S. PATENT DOCUMENTS

| | | | |
|---|---|---|---|
| 2014/0244013 A1* | 8/2014 | Reilly | G06F 3/165 700/94 |
| 2015/0195315 A1* | 7/2015 | Kidron | G06F 17/30743 709/219 |
| 2016/0154783 A1* | 6/2016 | Hebert | G06F 17/2705 707/755 |

* cited by examiner

REFINING MEDIA PLAYBACK

BACKGROUND

As electronic devices become increasingly sophisticated, people are using such devices in new and interesting ways. Some of these devices have adopted voice control where the device can perform various actions in response to a spoken question or instruction. For example, in response to a question or instruction, these devices can provide information, music, audiobooks, news, weather, traffic, sports, control connected devices, etc. In various situations involving media content, the user may want to refine or otherwise control the playback of the media content using spoken instructions. Conventional approaches typically enable the user to control basic navigation and selection of media content. However, the lack of control can be frustrating to some users and in some instances negatively affect the overall user experience associated with using computing devices to manage media content.

BRIEF DESCRIPTION OF THE DRAWINGS

Various embodiments in accordance with the present disclosure will be described with reference to the drawings, in which.

DETAILED DESCRIPTION

Figure 1:
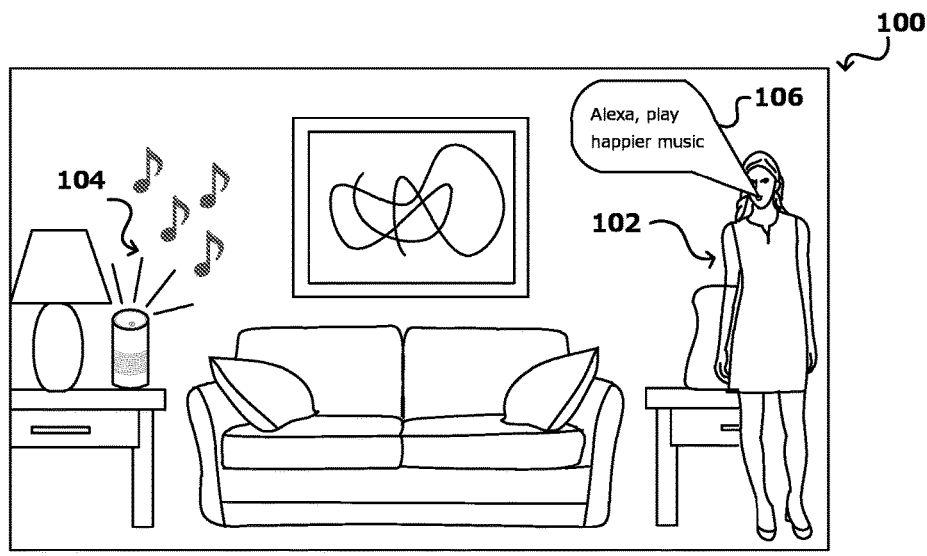
FIG. 1 illustrates an example environment in which aspects of the various embodiments can be utilized.

Systems and methods in accordance with various embodiments of the present disclosure may overcome one or more of the aforementioned and other deficiencies experienced in conventional approaches to controlling playback of media content. In particular, various approaches provide for using a voice communications device to control, refine, or otherwise manage the playback of media content in response to a spoken instruction.

For example, and as described further herein, a voice communications device can perform various actions in response to a spoken question or request. In one such example, the voice communications device can receive a request to refine the playback of media content, such as music, news, audio books, audio broadcasts, and other such content. In this example, audio input data that includes the request can be received by the voice communications device and an application executing on the voice communications device or otherwise in communication with the voice communications device can analyze the audio input data to determine how to carry out the request. The request can be used to, for example, refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the active play queue. In accordance with an embodiment, the application can determine whether there is an active play queue of media content configured to play using the voice communications device, such as a playlist of music, a station of music, a mix of songs, etc. In the situation where there is no media content being played by the voice communications device or no active play queue of media content, the application determines media content to add to an active play queue using information in the request. The information can include various attributes that can be used to search a catalog of media content to identify media content matching those attributes. In accordance with various embodiments, the information can be used to identify media content associated with a mood, a tempo, a genre, an artist (i.e., an entity type), a year, a decade, a range of dates, a relative time period (i.e., newer or older from a current date), an activity (e.g., dance, running, lifting weights, etc.), subsets thereof, as well as any other topic or interest or combination thereof. The identified media can thereafter be played using the voice communications device.

In the situation where there is an active play queue of media content, the information can be used to refine the play queue. For example, the information can include one or more refinements. A refinement can be used to filter media content from an active play queue of media content, add media content to the active play queue of media content, re-order the sequence of content in the active play queue, supplement the active play queue, and/or change the frequency of playback of content in the play-queue. As described, the refinements can be used to identify media content associated with a mood, a tempo, a genre, an artist, a year, a decade, an activity, subsets thereof, as well as any other topic or interest or combination thereof. An attribute is generally received in an initial request for media content and can be used to determine media in a catalog of media matching those attributes.

In certain embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music. In this way, the semantic representation of a user utterance can be an interpretation of the intent of the user, rather than merely a transcription or other lexical representation of the user's request. The interaction can continue until the user is satisfied with the media content being played. Various other functions and advantages are described and suggested below in accordance with the various embodiments.

FIG. 1 illustrates an example environment 100 wherein a user 102 is interacting with a voice communications device 104. Although a voice communications device (e.g., Amazon Echo) is shown, it should be understood that various other types of electronic device that are capable of receiving electronic messages can be used in accordance with various embodiments discussed herein. These devices can include, for example, portable computing device, notebook computers, ultrabooks, tablet computers, mobile phones, personal data assistants, video gaming consoles, televisions, set top boxes, smart televisions, portable media players, and wearable computers (e.g., smart watches, smart glasses, bracelets, etc.), display screens, displayless devices, other types of display-based devices, smart furniture, smart household devices, smart vehicles, smart transportation devices, and/or smart accessories, among others. A voice-enable communications device includes, for example, any device having a microphone or other component configured to generate audio data from sound in the frequency range in which humans communicate. As will be described further herein, voice communications devices include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, user 102 can speak a request within an environment where the voice communications device 104 is located. The request may be any question, inquiry, instruction, phrase, or other set of one or more words/sounds. For example, the user may say, "Alexa, play happier music." In this example, the word "Alexa" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the voice communications device. Persons of ordinary skill in the art will recognize, however, that the one or more microphones may alternatively be located on a separate device in communication with the voice communications device. In some embodiments, after the wakeword is detected, the voice communications device may begin interpreting/analyzing audio input data until no more speech is detected. In general, the voice communications device 104 constantly listens for the wakeword and is otherwise inactive. Once the wakeword is recognized, the voice communications device switches from a passive mode to an active mode. It should be noted that the wakeword does not have to be the first word or sound in a given sentence or request. The voice communications device can be configured such that it can record and store a limited amount of audio input data that should, in most instances, is the amount of time needed to speak a sentence or more. Accordingly, even if a wakeword is recognized in the middle or end of a sentence, the voice communications device will have retained the entire sentence which can then be analyzed by backend servers to determine what is being requested.

An application (e.g., a media service) executing on the voice communications device or otherwise in communication with the voice communications device, can analyze the user's speech (also referred to as utterance) that includes audio input data 106 to perform at least one function. The functions can include, for example, answering questions, playing music, reading audiobooks, controlling connected devices via voice commands/instructions, sending an electronic message (e.g., a text message or a voice message) initiating a phone call, among other such functions. In this example, the user 102 is attempting to refine an active play queue (or current set of media content or media content) being played using the voice communications device. An active play queue includes media content that is going to play next. The active play queue can include the current playing media content, followed by media content that is queued to play next. Media content can include music, news, audio books, audio broadcasts, and other such content.

The voice communications device can be associated with a customer account provided by a service provider. The customer account can include one or more profiles, e.g., one or more family member profiles or other profiles, where each profile can be associated with preferences, access rights, and other information, and may share certain account settings as may include payment information (same credit card), address, media content access types, etc. In the situation where one of the members desires to play media or refine media that is playing, the member can activate the voice communications device, for example, using a wakeword, announce who they are, and then speak the text message. Announcing who they are can cause the device to load the appropriate member profile and corresponding preferences, access rights, and other such information. In various embodiments, rather than have a member announce who they are, the voice communications device can automatically determine the member speaking using speech analysis software. For example, an application executing on the voice communications device or otherwise in communication with the device can analyze the speaker's voice to determine an identity of the speaker and associated profile. Based on the identity of the speaker, the appropriate member profile and corresponding preferences, access rights, and contracts authority can be used. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In this example, the customer account can be associated with a user profile associated with user 102, where the user has associated at least one media service with their user account. The media service can include an online service that provides access to media content, such as music, e-books, audio broadcasts, etc. In one example, the media service can be associated with an online electronic marketplace that provides media content. Moreover, in some embodiments, the media service can comprise one or more media libraries or databases. The service provider can provide an internet-based voice service as well as other services. The voice service can receive and can analyze audio input data using speech recognition software and/or other audio analysis software to determine an action to perform based on the received audio input data. In this example, the user 102 is attempting to refine the playback of media content. To initiate the refinement process, the user 102 has spoken a request to play happier music.

In response to the user 102 speaking the phrase "Alexa, play happier music," audio input data 106 that includes the phrase is received at the voice communications device 104 and an application executing on the voice communications device or otherwise in communication with the voice communications device can analyze the audio input data 106. For example, the contents of the audio input data can be streamed to a backend server (see FIG. 8 for further explanation) such that at least a portion of the audio input data can be received by the backend server and analysis can begin on that portion and any subsequent portions immediately upon receipt. In particular, the backend server can begin processing one or more portions of the audio input data prior to the user having completed making the instructions. Thus, the backend server can start analyzing whatever portion of the audio input data it received through a variety of techniques such as automatic speech recognition (ASR) and natural language understanding (NLU) to convert the audio input data into a series of identifiable words, and then to analyze those words in order to interpret the meaning of the request from the user. The backend server can utilize ASR techniques to recognize the spoken words that were recorded and stored in the audio data and to translate them into known text that can then be analyzed by NLU techniques to attempt to decipher the meaning of the request from user. Any suitable computer implemented speech-to-text technique may be used to convert the received audio signal(s) into text. In some embodiments, one or more filters may be applied to the received audio input data to reduce or minimize extraneous noise, however this is not required. In this example, analyzing the audio input data 106 can include determining refinement information "happier," media type "song," and an instruction "play," to refine the playback of media content. The backend server can then cause music associated with the refinement information to be played using the voice communications device.

Figure 2:
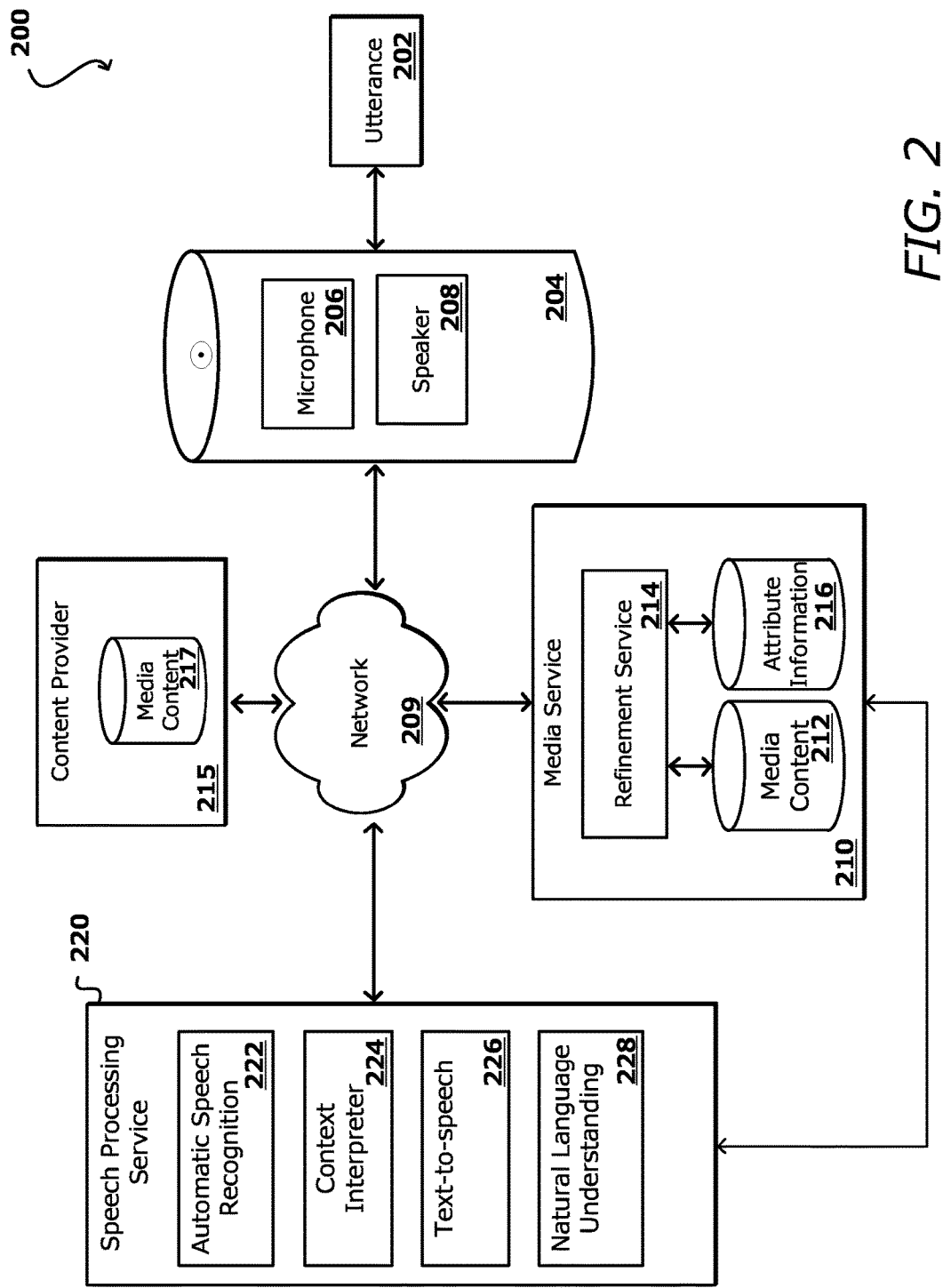
FIG. 2 illustrates an example system for controlling media playback using a voice communications device in accordance with various embodiments.

FIG. 2 illustrates an example system 200 controlling media playback using a voice communications device in accordance with various embodiments. In this example, system 200 shows example data flows between a speech processing service, a content provider, and a media service provider in response to receipt of user utterances. It should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein. The system 200 can include a computing device 204 (e.g., a voice communications device), a media service 210, a content provider 215, and a speech processing service 220. In this example, a user may make an utterance 202, such as an utterance that includes a spoken command for the speech processing service to perform some task, such as to control playback of media content. The user may speak the utterance into (or in the presence of) the voice communications device. The voice communications device 204 can correspond to a wide variety of electronic devices. In some embodiments, the voice communications device may be a computing device that includes one or more processors and a memory which may contain software applications executed by the processors. The voice communications device may include or be in communication with an audio input component for accepting speech input on which to perform speech recognition, such as a microphone 206. The voice communications device may also include or be in communication with an output component for presenting responses or other information from the speech processing service 220, such as a speaker 208. The software of the voice communications device may include hardware components and/or software for establishing communications over wireless communication networks or directly with other computing devices.

The media service 210 can correspond to an online service that provides access to media content, such as music, e-books, audio broadcasts, etc. In one example, the media service 210 can be associated with an online electronic marketplace that provides media content. Moreover, in some embodiments, the media service 210 can comprise one or more media libraries or databases 212. It is important to note that although shown as being included with the media service 210, in some embodiments, the one or more media libraries 212 can be separate from the media service 210. In other words, in some cases, the one or more media libraries 212 can reside on one or more servers external to one or more servers on which the media service 210 resides. For example, the media libraries can be stored in media content data store 217 provided by content provider 215. The content provider can be associated with media service 210 or can be a separate entity. The one or more media libraries 212, 217 can store, in part, data representative of media content. The data representative of media content can be accessible (e.g., downloading, streaming, etc.) to the voice communications device 204. The voice communications device 204 can acquire (e.g., download, stream, etc.) the data from the media service 210 and/or content provider 215 and, as a result, play the media content. The media content in the data store can be associated with refinement information/attribute information, metadata, and other such information stored in attribute data store 216. In accordance with various embodiments, a refinement can be an attribute used to update an active play queue of media content. For example, a refinement can be used to filter media content from an active play queue of media content, add media content to the active play queue of media content, re-order the sequence of content in the active play queue, supplement the active play queue, and/or change the frequency of playback of content in the play-queue. An attribute is generally received in an initial request for media content. The attribute(s) in the request can be used to determine media in a catalog of media matching those attributes. Metadata can include, for example, title, artist, album, track number, and other information about the media content. Refinement/attribute information can include, for example, mood, tempo, an activity or any other such information. A request with refinement/attribute instructions can include information to identify media content associated with a mood, a tempo, a genre, an artist, a year, a decade, an activity as well as any other information. As will be described further herein, a refinement service 214 can be used to filter media content from an active play queue of media content, add media content to the active play queue of media content, re-order the sequence of content in the active play queue, supplement the active play queue, and/or change the frequency of playback of content in the play-queue. In various embodiments, the refinement service, when managing an active play queue of media content, can rank or otherwise organize an order of media content playback for an active play queue, catalog of media, or other initial set of media content. In this approach, media content is not filtered or removed from an initial (or previously managed set of media content); rather, an order of playback of the media content is determined based on the refinement(s)/attribute(s) in a request for media content playback, and the order is used to playback the media content.

The speech processing service 220 can receive a user utterance 202 via communication network 209. The speech processing service 220 can be a network-accessible service in communication with the voice communications device 204 via the communication network, such as a cellular telephone network or the Internet. A user may use the voice communications device 204 to submit utterances, receive information, and initiate various processes, either on the voice communications device or at the speech processing service 220. For example, as described, the user can issue spoken commands to the voice communications device 204 in order to control, refine, or otherwise manage the playback of media content.

The speech processing service 220 may include an automatic speech recognition (ASR) module 222 that performs automatic speech recognition on audio data regarding user utterances, a natural language understanding (NLU) module 228 that performs natural language understanding on transcriptions generated by the ASR module 222, a context interpreter 224 that applies contextual rules to current NLU results based on prior interpretations and dialog acts, a natural language generation ("NLG") module that converts certain dialog acts into user-understandable communications (e.g., text that can be "read" to the user by a text-to-speech 226 or "TTS" component), among other such modules.

The speech processing service 220 may include any number of server computing devices, desktop computing devices, mainframe computers, and the like. Each individual device may implement one of the modules or components of the speech processing service 220. In some embodiments, the speech processing service 220 can include several devices physically or logically grouped together to implement one of the modules or components of the speech processing service 220. For example, the speech processing service 220 can include various modules and components combined on a single device, multiple instances of a single module or component, etc. In one specific, non-limiting embodiment, the speech processing service 220 may include a server or group of servers configured with ASR and/or NLU modules 222, 228, a server or group of servers configured with a context interpreter 224 and/or a text-to-speech 226, etc. In multi-device implementations, the various devices of the speech processing service 220 may communicate via an internal communication network, such as a corporate or university network configured as a local area network ("LAN") or a wide area network ("WAN"). In some cases, the devices of the speech processing service 220 may communicate over an external network, such as the Internet, or a combination of internal and external networks.

In some embodiments, the features and services provided by the speech processing service 220 may be implemented as web services consumable via a communication network. In further embodiments, the speech processing service 220 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing service 220 may be integrated into the voice communications device such that network connection and one or more separate computing systems are not necessary to perform the processes of the present disclosure. For example, a single voice communications device may include the microphone 206, the ASR module 222, the NLU module 228, the context interpreter 224, the text-to-speech 226 module, or some combination thereof.

As described, users may submit utterances that may include various commands, requests, and the like. The microphone 206 may capture utterance audio and provide it (or data derived therefrom) to the speech processing service 220. The ASR module 222 may generate ASR results for the utterance, such as a w-best list of transcriptions. Each transcription or portion thereof may be associated with some score, such as a confidence score or a likelihood that the transcription or portion thereof is correct. The w-best list or some other type of results may be provided to the NLU module 228 so that the user's intent may be determined. A w-best list of interpretations (e.g., intents) may be determined or generated by the NLU module 228 and provided to the context interpreter 224. The context interpreter 224 can process the NLU results (e.g., modify individual interpretations, filter interpretations, re-score or re-rank interpretations, etc.). The result can include refinement information used to refine a queue of media, information to determine media to playback, navigate, or otherwise control and/or select media.

In accordance with various embodiments, the result can be provided to the media service to refine and/or initiate playback of media content using the voice communications device. For example, the media service can determine whether there is an active play queue of media content playing on the voice communications device, such as a playlist of music. This can include, for example, accessing information associated with a user's account of the voice communications device. The information can indicate any active applications, such as media streaming applications and a state of such application. State information indicative of a state of a media streaming application can include, for example, information that indicates media content being played, the type of media content being played, whether there is an active queue of media content to be played, etc. In accordance with an embodiment, in the situation where there is no media content being played by the voice communications device, the media service determines media content to playback using information (e.g., the type of media content requested and any other information about the media content requested) in the request. The information can be used to search a catalog of media content stored in media content data store 210 or other such data store to identify media content to playback. The identified media content can thereafter be played using the voice communications device 204.

In the situation where there is an active play queue of media content, the information can be used to refine the play queue. For example, the result can include instructions such as refinement instructions that can be used by the refinement service 214 to filter media content from an active play queue of media content, add media content to the active play queue of media content, re-order the sequence of content in the active play queue, supplement the active play queue, and/or change the frequency of playback of content in the play-queue. As described, the media content is associated with refinement information, metadata, and other such information. The refinement instructions or other such information determined in the utterance can be compared to corresponding information associated with the media content to determine media content that matches the refinement instructions to at least a threshold level. In accordance with an embodiment, the determined media content can be used to filter (e.g., remove) and/or add media content to the active play queue and the media service can cause the media content associated with the updated active play queue to be played using the voice communications device.

In accordance with an embodiment, the refinement service can additionally or alternatively rank or otherwise re-order media content playback for an active play queue, catalog of media, playlist, or other set of media content. In this approach, media content is not filtered and/or removed from an initial (or previously managed set of media content); rather, an order of playback of the media content is determined based on the refinement(s)/attribute(s) in a request for media content playback, and the order is used to playback the media content. For example, in the situation where the active play queue includes "90's Alternative Rock" media content that included the full 90's-era works of Pearl Jam, among others, a request to "Play more Pearl Jam" wouldn't add media content to the active play queue (it already contains all of pearl jam), but could move Pearl Jam to take up more spaces at the current position of the active play queue, and/or add duplicates further down so that Pearl Jam continues to play at a high rate compared to other media content in the active play queue.

In accordance with an embodiment, the refinement service can supplement the active play queue. A refinement request to trigger supplementing the play queue can include, for example, "play more of a particular artist, genre, band, or other such entity," "mix in a particular artist, genre, band, etc.," or another such request. In this situation, media content matching the request is mixed into the active play queue, playlist, etc. with the media content already in the active play queue. Mixing media content into the play queue can include, for example, adding media content such that the added media content is played in accordance with a predetermined playback frequency. An example playback frequency is one mixed in song for every three songs. In an example use case, a voice communications device can receive a first request to play a jazz station. In response to the first request, the voice communications device can play a smooth jazz station or other similar station. The voice communications device can receive a second request to play less of a first artist (e.g., Kenny G) and only music in a particular decade (e.g., 80s.) In response to the second request, a predetermined number of Kenny G. songs can be filtered, leaving some Kenny G. and other smooth Jazz songs from the 80s in the active play queue. The voice communications device can receive a third request to play more of a second artist (e.g., Miles Davis). In response to the third request, the catalog of media content can be searched to determine Miles Davis songs from the 80s. The songs can be selected based on popularity of the song or some other characteristic. The selected Miles Davis songs can be mixed in with the other media content. The order of the songs (Miles Davis and other media content) can be re-arranged to favor, for example Miles Davis. This can include one or more of initiating playback with a Miles Davis song, playing back the media content in a predetermined ratio of media content (e.g., one of four songs is a Miles Davis song), etc. The resulting station is a user personalized 80s smooth jazz ply Miles Davis station.

In accordance with various embodiments, in response to updating the active play queue, the voice communications device can communicate interaction details of the update via a speaker of the voice communication device and/or to a companion app of the voice communications device. For example, after the first request is processed, the voice communications device can communicate that a smooth jazz station is playing. In another example, after the second request is processed, the voice communications device can communicate that Kenny G songs are filtered out and smooth jazz songs from the 90s and later are filtered out. In yet another example, after the third request is processed, the voice communications device can communicate that a certain number of Miles Davis songs have been mixed into the active play queue. It should be noted that other interaction details can be communicated via the voice communications device. These can include, for example, an interaction detail communicating the number of songs left in an active play queue in response to the refinement request to play more mellow music, an interaction detail communicating an amount of media content added to a play queue, an interaction detail communicating that the refinement was treated as a new request, an interaction detail communicating media content currently playing, in the active play queue/playlist/station, etc., among other such interaction details.

In the situation where no media content is identified to playback on the voice communications device, the result can be provided to the text-to-speech 226 component which can translate a semantic response into human-readable text, synthesized speech, etc. The translated response can be provided to the voice communications device and played using the voice communications device.

Figure 3:
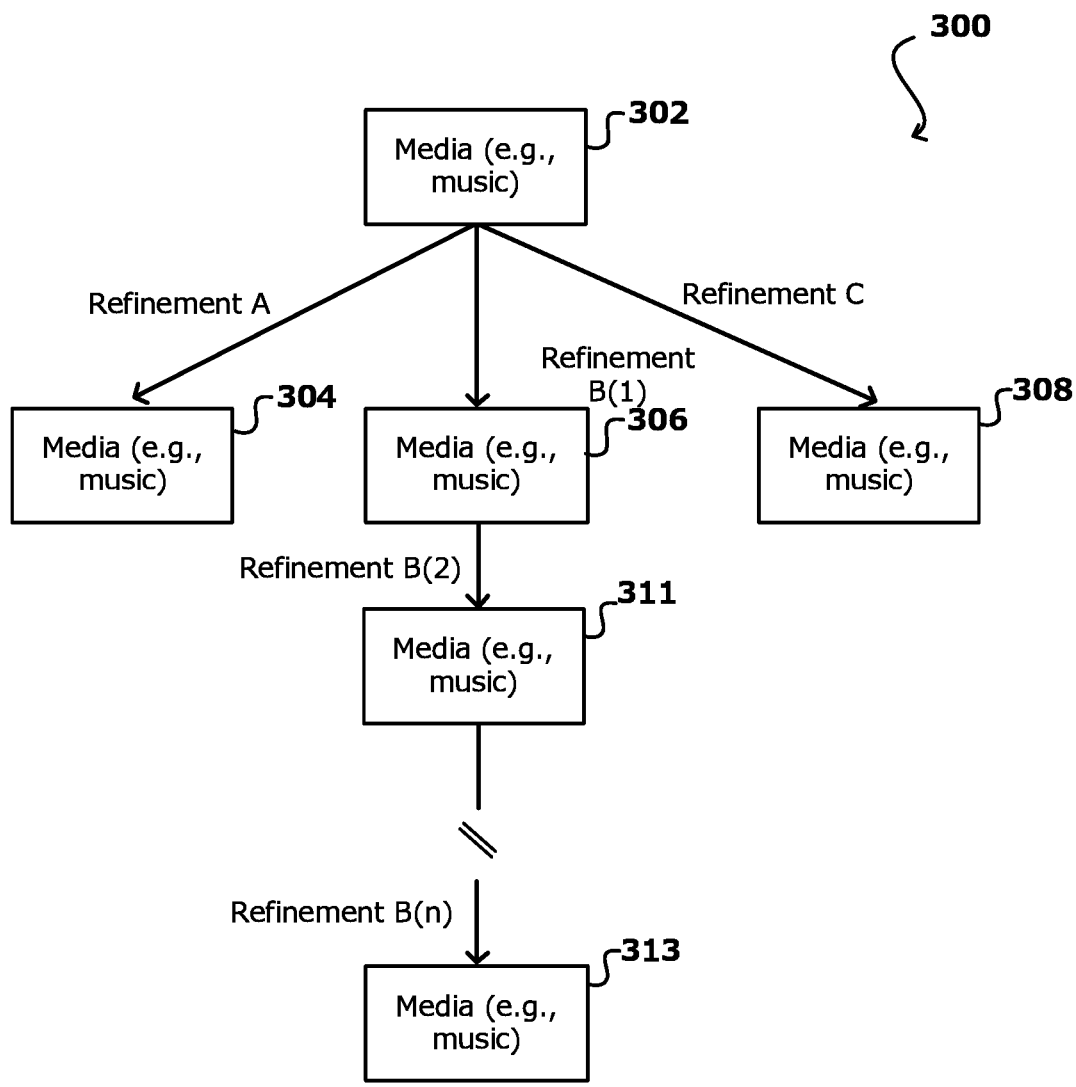
FIG. 3 illustrates an example approach for refining media playback in accordance with various embodiments.

FIG. 3 illustrates an example approach 300 to refining media playback in accordance with various embodiments. In this example, a voice communications device is being used to play media content, for example media content 302 (e.g., a station, a playlist, music, etc.). The media content 302 can be part of, for example, a play queue that includes top hit music from the 80s. It should be noted that the play queue can include music associated with any tempo/mood, artist, decade, date, an activity or some other media type (e.g., an audio book, broadcast, podcast, etc.) It should be further noted that the play queue can be a playlist or some other organization approach to media content. A request that includes refinements can be received at the voice communications device to refine the play queue. As described, a refinement can be an attribute used to update media content. An attribute is generally received in an initial request for media content. The attribute(s) in the request can be used to determine media in a catalog of media matching those attributes. In this example, since the request is to refine a play queue, the request includes refinement information. Audio input data that includes the request can be received by the voice communications device and an application executing on the voice communications device or otherwise in communication with the voice communications device can analyze the audio input data to determine how to carry out instructions in the request. The instruction can include one or more refinements that can be used to filter media content from an active play queue of media content, add media content to the active play queue of media content, re-order the sequence of content in the active play queue, supplement the active play queue and/or change the frequency of playback of content in the play-queue. The one or more refinements can be used identify music associated with a mood, a tempo, an activity etc. For example, refinement A can be used to filter the play queue to include media content 304 (e.g., "funky" music), refinement B(1) can be used to filter the play queue to include media content 306 (e.g., "happy" music), and refinement C can be used to filter the play queue to include media content 308 (e.g., "mellow" music). It should be noted that other instructions can be included in such audio data received at the voice communications device. For example, the audio data can include the following instructions: "Alexa, more mellow," "Alexa, less depressing," "Alexa, play more like this," "Alexa, no rap music," "Alexa, don't play One Direction," "Alexa, more Carrie Underwood," "Alexa, no 80's music," "Alexa, only 90's music," "Alexa, nothing before 2010," "Alexa, something new," "Alexa, play something more mainstream," "Alexa, more underground music/artist," "Alexa, only songs only at this speed," "Alexa, play something to cheer me up," "Alexa, more ballads like this current song," among others.

In various embodiments, the user can further refine the playback of media content. For example, in the situation where the user is engaging in a multi-turn dialog interaction with the voice communications device, where the user sends multiple instructions to the voice communications device to refine the media content playing, the user can first instruct the device to play "happy" music, as in the situation using refinement B(1) to filter the play queue to include media content 306 (e.g., "happy" music). If the user desires "happier" music, the user can instruct the voice communications device to play "happier" music using refinement B(2) to filter the play queue to include media content 311 (e.g., "happier" music). This process can continue. For example, the user can continue refining the music to play "happier" media content 313 or different media content all together. Accordingly, determining media content to playback can be a continuous process where one or more users can interact with the voice communications device until desired media content is playing. The users can continue to refine the media content using different refinements, using the same refinement to further refinement an active play queue, by combining refinements, etc. In accordance with various embodiments, the request can include a plurality of refinements and/or multiple refinements can be requested in a multi-turn dialog interaction. In either situation, refinement operations can be commutative. For example, re-ordering the sequence of refinements or combining refinement steps together can result with the same result (e.g., the selected media content.)

Figures 4, 5:
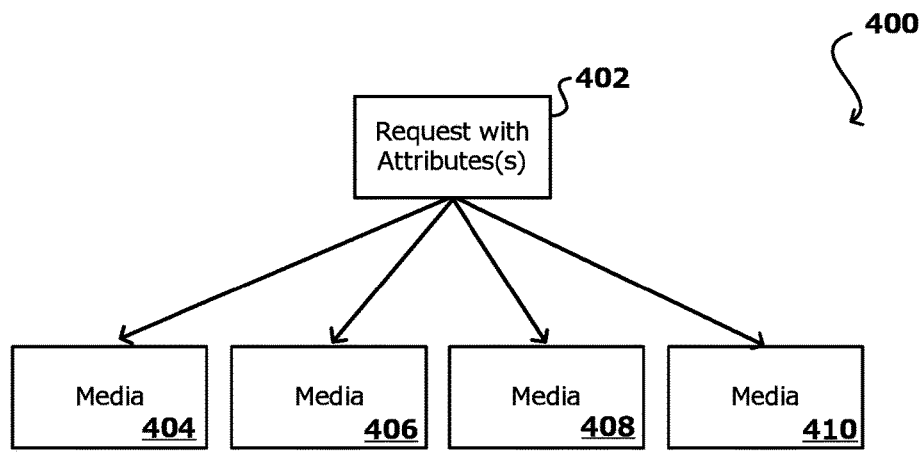
FIG. 4 illustrates an example approach for initiating media playback in accordance with various embodiments.
FIG. 5 illustrates an example data table that includes information to be associated with media content in accordance with various embodiments.

FIG. 4 illustrates an example 400 to initiate media playback using a voice communications device in accordance with various embodiments. In this example, a voice communications device is being used to initiate media playback, for example a station, a playlist, etc. of a particular type of media. The media content type in this example is music. Music includes vocal or instrumental sounds (or both) ordered combined in succession, in combination, and in temporal relationships to produce a composition. Music can include songs, wherein a song can include a short musical composition of words and music. A request 402 that includes audio input data requesting to play music is received at the voice communications device. An application executing on the voice communications device or otherwise in communication with the voice communications device can analyze the request audio input data to determine how to carry out the request. The audio input data can include information corresponding to one or more attributes that can be used to determine music to playback using the voice communications device. For example, the attributes can be used to identify media content 404, 406, 408, and 410, wherein the attribute can be associated with a mood, a tempo, a genre, an artist, a year, a decade, an activity, as well as any other topic or interest. In various embodiments, a combination of attributes can be used to determine media content used for playback. In this example, because there is no active play queue of media content, the application determines media content to playback using the attribute(s) in the input audio data. The identified media can thereafter be played using the voice communications device.

FIG. 5 illustrates example data table 500 that includes information to be associated with media content in accordance with various embodiments. In this example, the data shown in table 502 can be stored in a data store, such as data store 216 described in FIG. 2. As shown in FIG. 5, media content in media column 504 can be associated with information corresponding to attributes (506, 508) or other such information. Example attributes can correspond to a mood, a tempo, an activity, etc. As described, a refinement can be an attribute used to update an active play queue of media content. For example, a refinement can be used to filter media content from an active play queue of media content, add media content to the active play queue of media content, re-order the sequence of content in the active play queue, supplementing the active play queue, and/or change the frequency of playback of content in the play-queue. An attribute is generally received in an initial request for media content. The attribute(s) in the request can be used to determine media in a catalog of media matching those attributes. The attribute can be weighted or otherwise associated with a value. The weight can indicate a degree of association for a particular weight, where a higher weight corresponds to the media content having a higher association to that attribute. The media content can be associated with other metadata 510 as well. This can include title information, artist information, album information, track number information, and other information about the media content. It should be noted that attribute information, metadata, and other such information can be stored in table 502.

As described, the data can be used when searching a catalog of media content (e.g., media content 212 described in FIG. 2) to identify media content to playback using a voice communications device. A user can speak a request within an environment where the voice communications device is located. For example, if the user desires to have played "happy" music, the user may say, "Alexa, play happy music." An application (e.g., a media service) executing on the voice communications device or otherwise in communication with the voice communications device, can analyze the user's speech that includes audio input data to determine and playback happy music. To identify or otherwise determine "happy" music, or other types of music and/or media (e.g., funky music, sad music, etc.) requested, the application can use the attribute (refinement when managing an active play queue) in the user request (in this example the attribute is "happy") to filter music from a catalog of music by analyzing the data in table 502 to identify happy music. This can include comparing the attribute and/or refinement in the request to corresponding information associated with music in the catalog of music. Music in the catalog that matches with the attribute and/or refinement to at least a threshold level can be identified and used for playback using the voice enabled communications device.

In accordance with various embodiments, the refinements/attributes, weighting, and metadata in table 502 can be determined in a number of ways. In one such approach, one or more algorithms can analyze media content to identify such associations as well as the weight/value associated with each of the attributes for particular media content. Other information that can be analyzed includes user reviews, comments on the media content, personal preferences, user information, etc., and the information can be used as inputs to the one or more algorithms to determine the weights/values associated with the media content. In various embodiments, the weights/values associated with the media content can be unique to respective users of the service. For example, what is considered happier media content for a first user who is associated with first user information can be different from happier media content for a second user who is associated with second user information, where the first user information is different from the second user information. In some embodiments, the refinements/attributes, weighting, and metadata in table 502 can be manually determined. In various embodiments, such determinations can be a combination of algorithms and manual approaches. In various embodiments, determining such information can be based on a combination of information associated with media content. Such information can include user provided information, artist or composer or producer provided information, or other information associated with the media content. In accordance with various embodiments, one or more algorithms can aggregate the information and can classify the media content, for example, as "happy," "funky," or some other mood, activity, or category. As will be apparent to a person of reasonable skill in the art, there are a number of algorithms that can be used to sort and analyze information and any combination of these algorithms can be used. As will also be apparent to a person of reasonable skill in the art, any one of a number of classifications (e.g., happy, sad, funky, etc.) can be used to modify and/or otherwise refine a play queue, where such classifications can be updated and modified where appropriate, upon user demand, or under other such circumstances.

Figure 6:
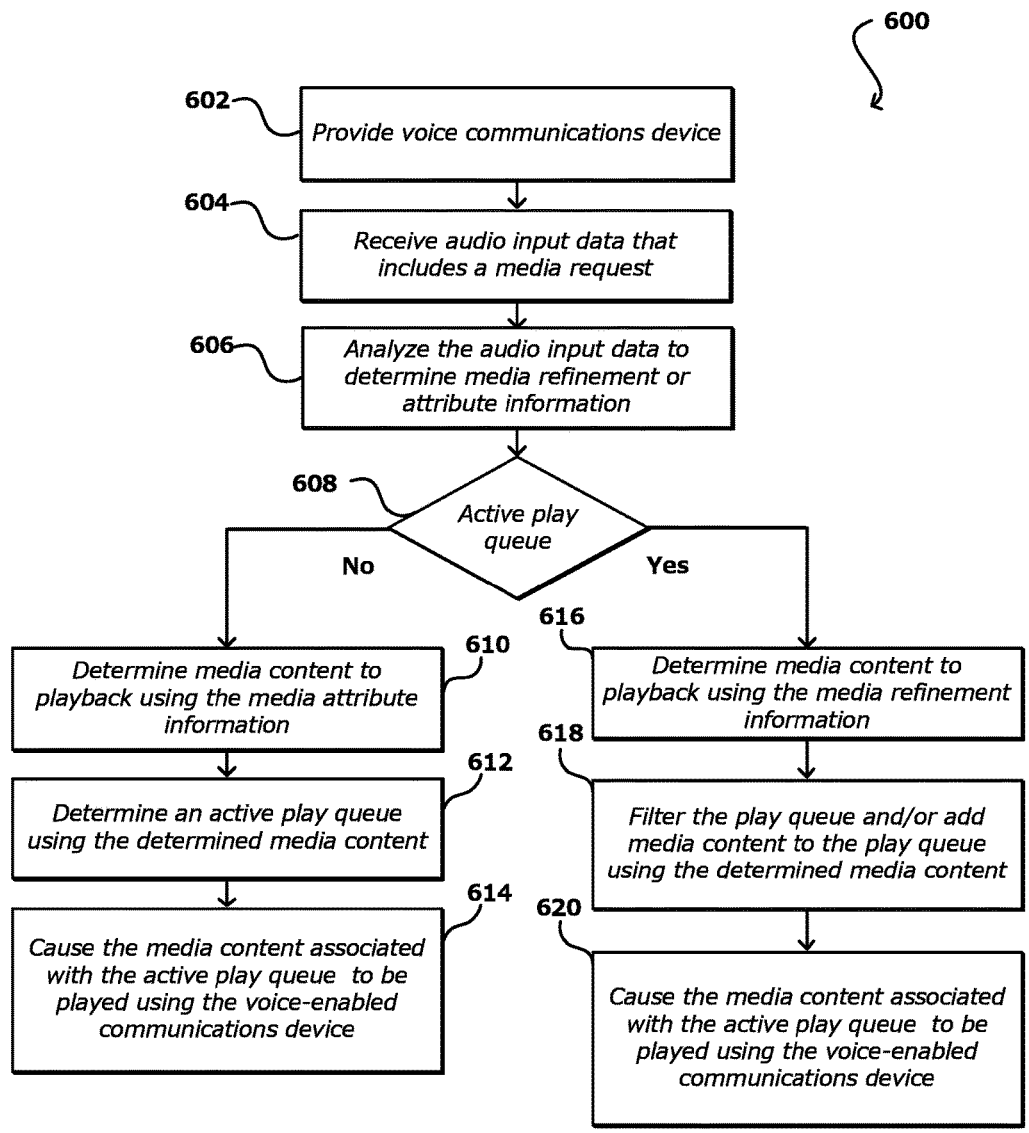
FIG. 6 illustrates an example process for controlling media playback in accordance with various embodiments.

FIG. 6 illustrates an example process 600 for controlling media playback in accordance with various embodiments. It should be understood that, for any process discussed herein, there can be additional, fewer, or alternative steps performed in similar or alternative orders, or in parallel, within the scope of the various embodiments unless otherwise stated. In this example, a voice communications device is provided 602. The voice communications device can be associated with a customer account provided by a service provider. The service provider can provide an internet-based voice service as well as other services. The voice service can receive and can analyze audio input data using speech recognition software and/or other audio analysis software to determine an action to perform based on received audio input data. The voice communications device can include one or more microphones that can capture voice or other audio input data, wherein an application executing on the voice communications device or otherwise in communication with the voice communications device can analyze the data to perform at least one function. The functions can include, for example, answering questions, playing music, reading audiobooks, controlling connected devices via voice commands/instructions, sending an electronic message (e.g., a text message or a voice message) initiating a phone call, among other such functions.

In this example, a user is associated with a customer account that is associated with at least one media service. The media service can include an online service that provides access to media content, such as music, e-books, audio broadcasts, etc. In this example, the user is attempting to initiate playback and/or refine an active play queue that includes media content being played using the voice communications device. For example, in response to the user speaking the phrase "Alexa, play more upbeat music," audio input data that includes a request for media content can be received 604 at the voice communications device and an application executing on the voice communications device or otherwise in communication with the voice communications device can analyze 606 the audio input data to determine media refinement/attribute information "upbeat," media type "music," and an instruction "play," which can be used to refine or otherwise initiate the playback of media content. As described, a refinement can be an attribute used to update an active play queue of media content. For example a refinement can be used to filter media content from an active play queue of media content, add media content to the active play queue of media content, re-order the sequence of content in the active play queue, supplement the active play queue, and/or change the frequency of playback of content in the play-queue. An attribute is generally received in an initial request for media content and can be used to determine media in a catalog of media matching those attributes Once the audio input data is analyzed, a determination 608 can be made whether an active play queue of music is playing using the voice communications device. An active play queue of music can include one or more music tracks. In accordance with an embodiment, determining whether an active play queue of music is playing or is otherwise active can include, for example, accessing information associated with a user's account of the voice communications device, where the information can indicate any active applications, such as media streaming applications and a state of such applications. State information indicative of a state of a media streaming application can include, for example, information that indicates media content being played, the type of media content being played, whether there is an active queue of media content to be played, etc. In the situation where there is no media content being played using the voice communications device, the media service determines 610 media content to playback using the media attribute information "upbeat" and media type "music." The information can be used to search a catalog of media content stored in media content data store or other such data store to identify media content to playback using the voice communications device. Using the determined media content, an active play queue, playlist, etc. of media content can be determined 612, and the application can cause 614 the media content associated with the active play queue to be played using the voice communications device.

In the situation where there is an active play queue of media content, the information can be used to refine the active play queue. For example, the information can include instructions such as refinement instructions (in this example "upbeat" music) that can be used to determine 616 other happy media content to refine the active play queue. In this example, the media content in a data store is associated with refinement information, metadata, and other such information. The refinement instructions or other such information can be compared to corresponding information associated with the media content in the data store to determine media content that matches the refinement instructions to at least a threshold level. The determined media content can be used to filter media content from an active play queue of media content, add media content to the active play queue of media content, re-order the sequence of content in the active play queue, and/or change the frequency of playback of content in the play-queue. In this example, the determined media content is used to filter 618 media content from the active play queue. For example, music associated with the play queue that is not determined to be upbeat can be removed. Additionally or alternatively, music that is determined to be upbeat can be added to the active play queue. Thereafter, the application can cause 620 the media content associated with the updated active play queue to be played using the voice communications device.

Figure 7:
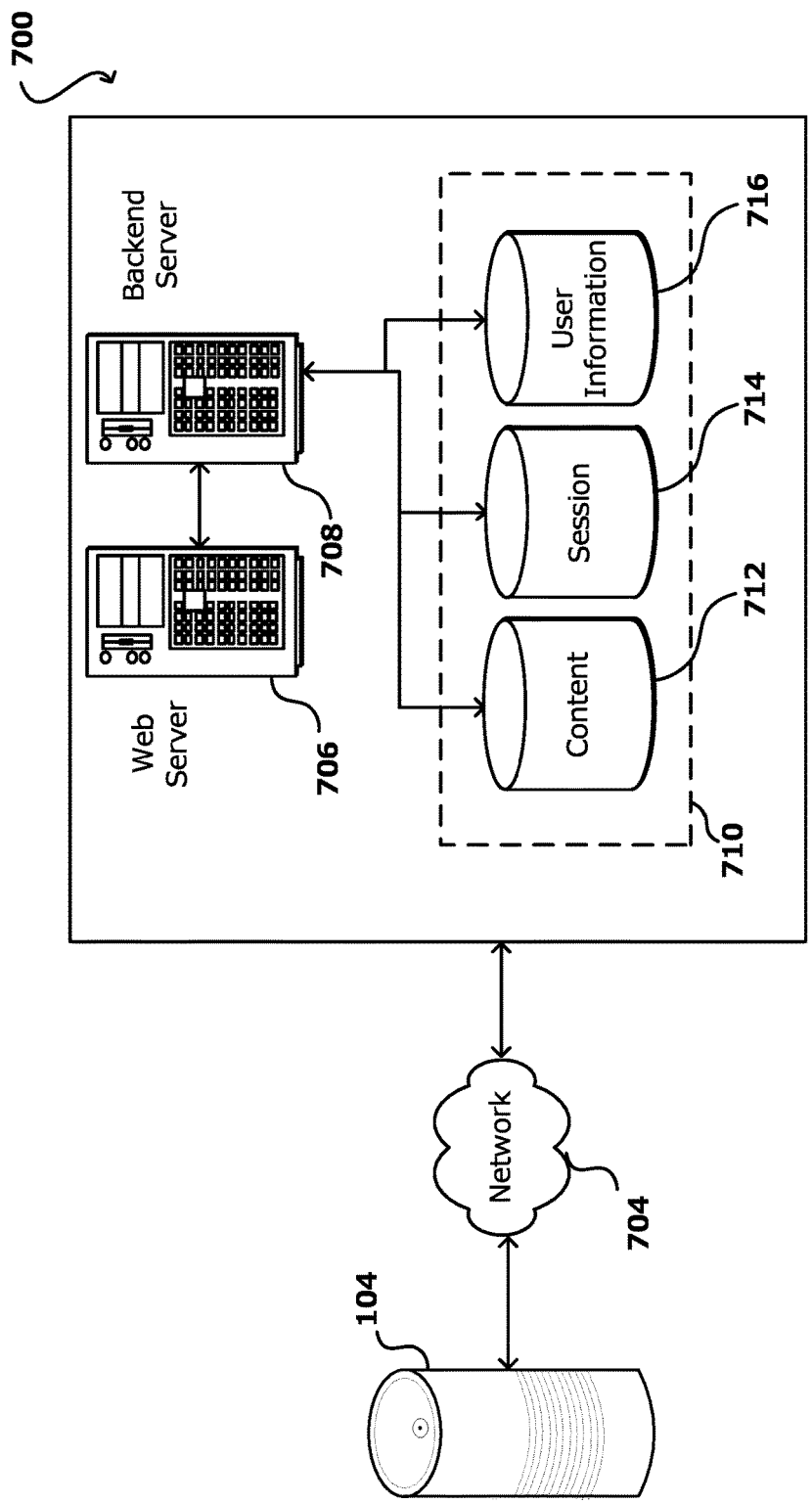
FIG. 7 illustrates an example environment in which various embodiments can be implemented.

In accordance with various embodiments, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes voice communications device 104, which can include any appropriate device operable to send and receive requests, messages or information over network 704 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one backend server 708 and a data store 710. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 708 can include any appropriate hardware and software for integrating with the data store 710 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 706 in the form of HTML, XML or another appropriate structured language in this example. The handling of all requests and responses, as well as the delivery of content between the voice communications device 104 and the backend server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be other information that may need to be stored in the data store, such as page image information and access rights information, which can be stored in any of the above listed mechanisms as appropriate or in additional mechanisms in the data store 710. The data store 710 is operable, through logic associated therewith, to receive instructions from the backend server 708 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Figure 8:
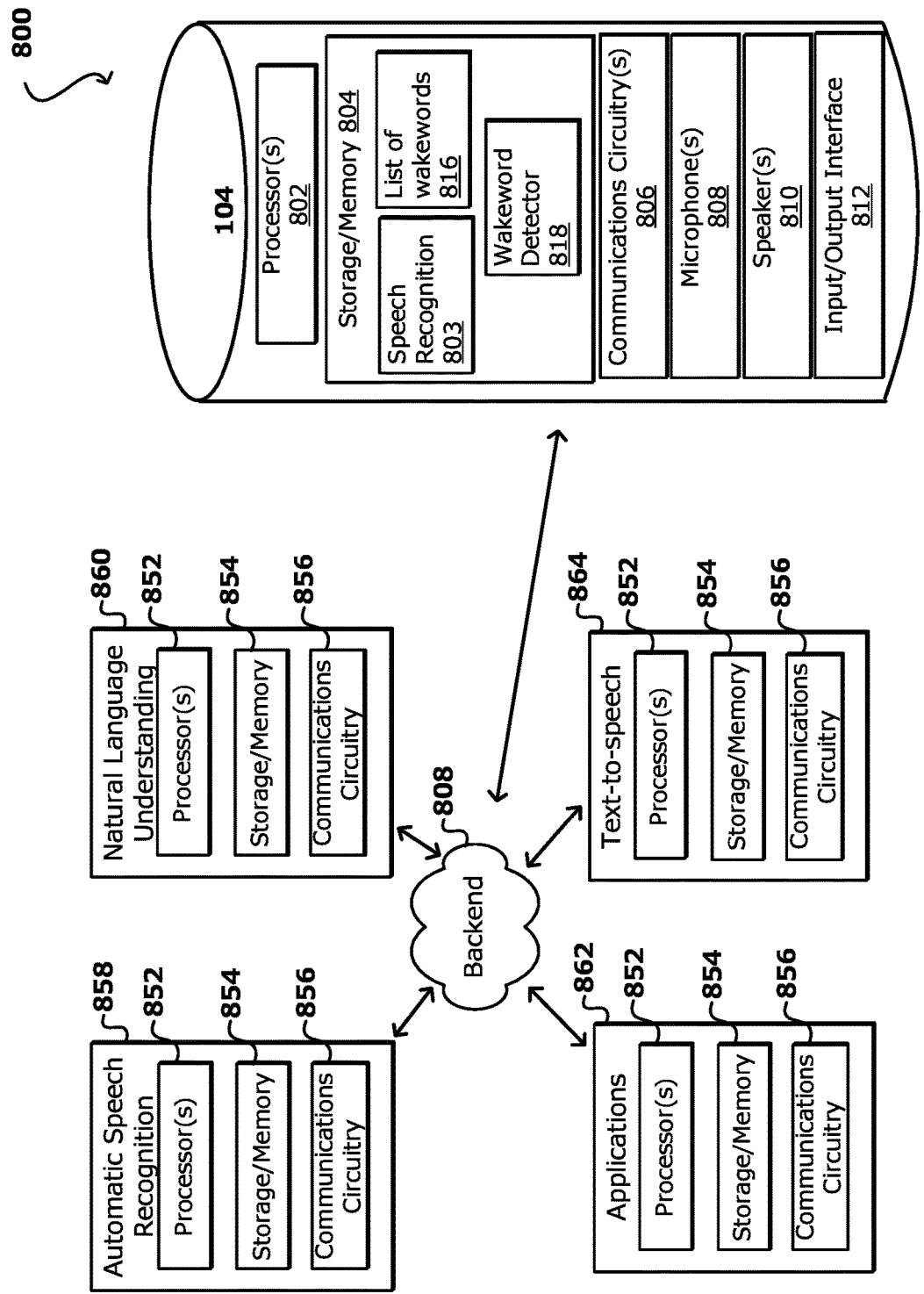
FIG. 8 illustrates an example for sending electronic communications between electronic devices.

FIG. 8 is another example environment 800 for implementing aspects in accordance with various embodiments. In this example, voice-enabled comunications device 104, in some embodiments, may correspond to any type of electronic device capable of being activated in response to detecting a specific sound. Voice-enabled comunications device 104 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled comunications device 104 may be relatively simple or basic in structure such that no mechanical input option(s) (e.g., keyboard, mouse, trackpad) or touch input(s) (e.g., touchscreen, buttons) may be provided. For example, voice-enabled comunications device 104 may be capable of receiving and outputting audio, and may include power, processing capabilities, storage/memory capabilities, and communication capabilities.

Voice-enabled comunications device 104 may include a minimal number of input mechanisms, such as a power on/off switch, however primary functionality, in one embodiment, of voice-enabled comunications device 104 may solely be through audio input and audio output. For example, voice-enabled comunications device 104 may listen for a wakeword by continually monitoring local audio. In response to the wakeword being detected, voice-enabled comunications device 104 may establish a connection with backend server 708, send audio input data to backend server 708, and await/receive a response from backend server 708. In some embodiments, however, non-voice-enabled devices may also communicate with backend server 708 (e.g., push-to-talk devices).

Voice-enabled comunications device 104 may include one or more processors 802, storage/memory 804, communications circuitry 806, one or more microphones 808 or other audio input devices (e.g., transducers), one or more speakers 810 or other audio output devices, as well as an optional visual input/output ("I/O") interface 812. However, one or more additional components may be included within voice-enabled comunications device 104, and/or one or more components may be omitted. For example, voice-enabled comunications device 104 may include a power supply or a bus connector. As another example, voice-enabled comunications device 104 may not include a visual I/O interface. Furthermore, while multiple instances of one or more components may be included within voice-enabled comunications device 104, for simplicity only one of each component has been shown.

Processor(s) 802 may include any suitable processing circuitry capable of controlling operations and functionality of voice-enabled communications device 104, as well as facilitating communications between various components within voice-enabled communications device 104. In some embodiments, processor(s) 802 may include a central processing unit ("CPU"), a graphic processing unit ("GPU"), one or more microprocessors, a digital signal processor, or any other type of processor, or any combination thereof. In some embodiments, the functionality of processor(s) 802 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 802 may include its own local memory, which may store program modules, program data, and/or one or more operating systems. However, processor(s) 802 may run an operating system ("OS") for voice-enabled communications device 104, and/or one or more firmware applications, media applications, and/or applications resident thereon.

Storage/memory 804 may include one or more types of storage mediums such as any volatile or non-volatile memory, or any removable or non-removable memory implemented in any suitable manner to store data on voice-enabled comunications device 104. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 804 may be implemented as computer-readable storage media ("CRSM"), which may be any available physical media accessible by processor(s) 802 to execute one or more instructions stored within storage/memory 804. In some embodiments, one or more applications (e.g., gaming, music, video, calendars, lists, etc.) may be run by processor(s) 802, and may be stored in memory 804.

In some embodiments, storage/memory 804 may include one or more modules and/or databases, such as speech recognition module 803, list of wakewords database 816, and wakeword detection module 818. Speech recognition module 803 may, for example, include an automatic speech recognition ("ASR") component that recognizes human speech in detected audio. Speech recognition module 803 may also include a natural language understanding ("NLU") component that determines user intent based on the detected audio. Also included within speech recognition module 803 may be a text-to-speech ("TTS") component capable of converting text to speech to be outputted by speaker(s) 810, and/or a speech-to-text ("STT") component capable of converting received audio signals into text to be sent to backend server 808 for processing.

List of wakewords database 816 may be a database stored locally on voice-enabled comunications device 104 that includes a list of a current wakeword for voice-enabled comunications device 104, as well as one or more previously used, or alternative, wakewords for voice-enabled comunications device. In some embodiments, user 102 may set or program a wakeword for voice-enabled comunications device 104. The wakeword may be programmed directly on voice-enabled comunications device 104, or a wakeword or words may be set by the individual via a backend server application (app) that is in communication with backend server 808. For example, a user may use their mobile device having the backend server application running thereon to set the wakeword. The specific wakeword may then be communicated from the mobile device to backend server 808, which in turn may send/notify voice-enabled comunications device 104 of the individual's selection for the wakeword. The selected activation may then be stored in list of wakewods database 816 of storage/memory 804.

Wakeword detection module 818 may include an expression detector that analyzes an audio signal produced by microphone(s) 808 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 808. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 808. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled comunications device 104 may then begin sending the audio signal to backend server 808 for detecting and responds to subsequent utterances made by a user.

Communications circuitry 806 may include any circuitry allowing or enabling voice-enabled comunications device 104 to communicate with one or more devices, servers, and/or systems. For example, communications circuitry 806 may facilitate communications between voice-enabled comunications device 104 and backend server 808. Communications circuitry 806 may use any communications protocol, such as any of the previously mentioned exemplary communications protocols. In some embodiments, voice-enabled comunications device 104 may include an antenna to facilitate wireless communications with a network using various wireless technologies (e.g., Wi-Fi, Bluetooth, radiofrequency, etc.). In yet another embodiment, voice-enabled comunications device 104 may include one or more universal serial bus ("USB") ports, one or more Ethernet or broadband ports, and/or any other type of hardwire access port so that communications circuitry 806 allows voice-enabled comunications device 104 to communicate with one or more communications networks.

Voice-enabled comunications device 104 may also include one or more microphones 808 and/or transducers. Microphone(s) 808 may be any suitable component capable of detecting audio signals. For example, microphone(s) 808 may include one or more sensors for generating electrical signals and circuitry capable of processing the generated electrical signals. In some embodiments, microphone(s) 808 may include multiple microphones capable of detecting various frequency levels. As an illustrative example, voice-enabled comunications device 104 may include multiple microphones (e.g., four, seven, ten, etc.) placed at various positions about voice-enabled comunications device 104 to monitor/capture any audio outputted in the environment where voice-enabled comunications device 104 is located. The various microphones 808 may include some microphones optimized for distant sounds, while some microphones may be optimized for sounds occurring within a close range of voice-enabled comunications device 104.

Voice-enabled comunications device 104 may further include one or more speakers 810. Speaker(s) 810 may correspond to any suitable mechanism for outputting audio signals. For example, speaker(s) 810 may include one or more speaker units, transducers, arrays of speakers, and/or arrays of transducers that may be capable of broadcasting audio signals and or audio content to a surrounding area where voice-enabled comunications device 104 may be located. In some embodiments, speaker(s) 810 may include headphones or ear buds, which may be wirelessly wired, or hard-wired, to voice-enabled comunications device 104, that may be capable of broadcasting audio.

In some embodiments, one or more microphones 808 may serve as input devices to receive audio inputs, such as speech. Voice-enabled comunications device 104, may then also include one or more speakers 810 to output audible responses. In this manner, voice-enabled comunications device 104 may function solely through speech or audio, without the use or need for any input mechanisms or displays.

In one exemplary embodiment, voice-enabled comunications device 104 includes I/O interface 812. The input portion of I/O interface 812 may correspond to any suitable mechanism for receiving inputs from a user of voice-enabled comunications device 104. For example, a camera, keyboard, mouse, joystick, or external controller may be used as an input mechanism for I/O interface 812. The output portion of I/O interface 812 may correspond to any suitable mechanism for generating outputs from voice-enabled comunications device 104. For example, one or more displays may be used as an output mechanism for I/O interface 812. As another example, one or more lights, light emitting diodes ("LEDs"), or other visual indicator(s) may be used to output signals via I/O interface 812 of voice-enabled comunications device 104. In some embodiments, one or more vibrating mechanisms or other haptic features may be included with I/O interface 812 to provide a haptic response to user 102 from voice-enabled comunications device 104. Persons of ordinary skill in the art will recognize that, in some embodiments, one or more features of I/O interface 812 may be included in a purely voice-enabled version of voice communications device 104. For example, one or more LED lights may be included on voice-enabled comunications device 104 such that, when microphone(s) 808 receive audio from user 102, the one or more LED lights become illuminated signifying that audio has been received by voice-enabled comunications device 104. In some embodiments, I/O interface 812 may include a display screen and/or touch screen, which may be any size and/or shape and may be located at any portion of voice-enabled comunications device 104. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 8 also includes backend server 808, as mentioned previously, which may be in communication with voice-enabled comunications device 104. Backend server 808 includes various components and modules including, but not limited to, automatic speech recognition ("ASR") module 858 (which may include, for example, speech-to-text ("STT") functionality), natural language understanding ("NLU") module 860, applications module 862, and text-to-speech ("TTS") module 864. In some embodiments, backend server 808 may also include computer readable media, including, but not limited to, flash memory, random access memory ("RAM"), and/or read-only memory ("ROM"). Backend server 808 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 858 may be configured such that it recognizes human speech in detected audio, such as audio captured by voice-enabled comunications device 104, which is then sent to backend server 808. ASR module 858 may include, in one embodiment, one or more processor(s) 852, storage/memory 854, and communications circuitry 856. Processor(s) 852, storage/memory 854, and communications circuitry 856 may, in some embodiments, be substantially similar to processor(s) 802, storage/memory 804, and communications circuitry 806, which are described in greater detail above, and the aforementioned descriptions of the latter may apply. NLU module 860 may be configured such that it determines user intent based on the detected audio received from voice-enabled comunications device 104. NLU module 860 may include processor(s) 852, storage/memory 854, and communications circuitry 856.

Applications module 862 may, for example, correspond to various action specific applications or servers capable of processing various task specific actions. Applications module 862 may further correspond to first party applications and/or third party applications operable to perform different tasks or actions. For example, based on the context of audio received from voice-enabled comunications device 104, backend server 808 may use a certain application to perform an action, such refining an active play queue of media content. Applications module 862 may include processor(s) 852, storage/memory 854, and communications circuitry 856. As an illustrative example, applications module 862 may correspond to a media service. The electornic media service application of the applications module 862 can be associated with a customer account. The customer account can include at least one profile stored in, for example, user information that can be linked to the electronic media service application in applications module 862. Audio input data can be received at automatic speech recognition module 858 from voice communications device 104. The automatic spech reconition module 858 can use automatic speech recognition (ASR) techniques on the audio input data to generate text data of the audio input data. The natural language understanding module 860 can use natural language understanding (NLU) techniques on the text data to determine refinement/attribute information to manage the active play queue. The electronic media service application of the applications module 862 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc. In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music.

TTS module 864 may employ various text-to-speech techniques. It should be noted that techniques for taking text and converting it into audio input data that can represent speech are well known in the art and need not be described in further detail herein, any suitable computer implemented techniques may be used. TTS module 864 may also include processor(s) 852, storage/memory 854, and communications circuitry 856.

Persons of ordinary skill in the art will recognize that although each of ASR module 858, NLU module 860, applications module 862, and TTS module 864 include instances of processor(s) 852, storage/memory 854, and communications circuitry 856, those instances of processor(s) 852, storage/memory 854, and communications circuitry 856 within each of ASR module 858, NLU module 860, applications module 862, and STT/TTS module 864 may differ. For example, the structure, function, and style of processor(s) 852 within ASR module 858 may be substantially similar to the structure, function, and style of processor(s) 852 within NLU module 860, however the actual processor(s) 852 need not be the same entity.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
a device processor;
a memory device including instructions that, when executed by the device processor, cause the computing system to:
receive audio input data from a voice communications device, the audio input data corresponding to an utterance received by a microphone of the voice communications device;
generate text data from the audio input data by performing automated speech recognition on the audio input data;
determine queue refinement information by performing natural language processing on the text data, the queue refinement information used to modify an active play queue using music from a catalog of music;
determine an active state of the active play queue;
analyze attributes associated with music in the catalog of music using the queue refinement information, the attributes being stored in a data store, wherein the attributes are correlated, via a calculated value, with the music in the catalog of music, the calculated value based at least in part on properties of the music, personal user preferences, and a user profile, to generate an updated active play queue by determining music from the catalog of music having attributes corresponding to the queue refinement information, when the calculated value is greater than a threshold amount, to include in the active play queue and music to remove from the active play queue; and
cause the updated active play queue to be played using the voice communications device.

2. The computing system of claim 1, wherein the instructions, when executed further enable the computing system to:
identify a list of queue refinements that includes one or more queue refinements;
use automatic speech recognition (ASR) techniques on the audio input data to generate the text data that represents words;
use natural language understanding (NLU) techniques on the text data to identify a queue refinement; and
analyze the list of queue refinements to identify the queue refinement as one of the one or more queue refinements.

3. The computing system of claim 1, wherein the instructions, when executed further enable the computing system to:
identify music in the catalog of music associated with the queue refinement information;
remove music from the active play queue that is not associated with the queue refinement information; and
add music from the catalog of music that is associated with the queue refinement information.

4. The computing system of claim 1, wherein the instructions, when executed further enable the computing system to:
analyze the catalog of music to determine a feature associated with music of the catalog of music; and
map a queue refinement of a list of queue refinements to the feature.

5. A computing system, comprising:
a computing device processor;
a memory device including instructions that, when executed by the computing device processor, enable the computing system to:

receive audio input data from a computing device that is associated with a customer account;

generate text data based at least in part on the audio input data;

determine an attribute associated with a type of media content based at least in part on the audio input data;

analyze a set of media content using the attribute, the attribute being correlated to the media content via a calculated value determined at least in part on properties of media content of the set of media content, personal user preferences, and a user profile, wherein the attribute and respective correlation to the media content is stored within an accessible data store, to determine a subset of media content of the set of media content associated with the type of media content having the calculated value that is above a threshold amount; and enable the subset of media content to be played using the computing device.

6. The computing system of claim 5, wherein the type of media content includes one of music, songs, music playlists, audio books, news information, weather information, events information, restaurant information, or movie information.

7. The computing system of claim 5, wherein the instructions, when executed further enable the computing system to:

identify a list of attributes that includes one or more attributes;

use automatic speech recognition (ASR) techniques on the audio input data to generate the text data that represents words;

use natural language understanding (NLU) techniques on the text data to identify an attribute; and analyze the list of attributes to identify the attribute as one of the one or more attributes.

8. The computing system of claim 7, wherein the list of attributes are used to identify similar media content, media content associated with a mood, a tempo, a genre, an artist, a year, a decade, an activity, or a relevance value.

9. The computing system of claim 5, wherein the attribute is used to refine a queue of music tracks, and wherein the instructions, when executed further enable the computing system to:

determine an active play queue of music configured to play using the computing device;

identify music included in the active play queue of music associated with the attribute; and remove music from the active play queue of music that is not associated with the attribute.

10. The computing system of claim 9, wherein the instructions, when executed further enable the computing system to:

determine an active play queue of music is not playing; and cause the computing device to recommend tracks of music based at least in part on the attribute.

11. The computing system of claim 5, wherein the subset of media content is determined based at least in part on a plurality of attributes included in the audio input data.

12. The computing system of claim 5, wherein the set of media content includes at least one of an active play queue of media content or a catalog of media content.

13. The computing system of claim 5, wherein the instructions, when executed further enable the computing system to:

identify media content in the set of media content associated with the attribute; and remove media content from the set of media content that is not associated with the attribute.

14. The computing system of claim 13, wherein the instructions, when executed further enable the computing system to:

analyze a catalog of media content using the attribute, and add media content from the catalog of media content associated with the attribute to the set of media content.

15. The computing system of claim 5, wherein the instructions, when executed further enable the computing system to:

identify a catalog of media content associated with a media type;

analyze the catalog of media content to determine a feature associated with respective media content of the catalog of media content; and map at least one attribute of a list of attributes to a feature associated with media content of the catalog of media content.

16. The computing system of claim 5, wherein the instructions, when executed further enable the computing system to:

receive additional audio input from the computing device;

analyze the additional audio input to identify an additional attribute; and analyze the subset of media content using the additional attribute to determine one or more media content to be played using the computing device.

17. A method, comprising:

receiving audio input data from a computing device that is associated with a customer account;

generating text data based at least in part on the audio input data by applying automatic speech recognition (ASR) techniques on the audio input data;

determining an attribute associated with a type of media content based at least in part on the audio input data;

analyzing a set of media content using the attribute, the attribute being correlated to the media content via a calculated value determined at least in part on properties of media content of the set of media content, personal user preferences, and a user profile, wherein the attribute and respective correlation to the media content is stored within an accessible data store, to determine a subset of media content of the set of media content associated with the type of media content having the calculated value that is above a threshold amount; and enabling the subset of media content to be played using the computing device.

18. The method of claim 17, further including:

identifying a list of attributes that includes one or more attributes;

using natural language understanding (NLU) techniques on the text data to identify an attribute; and analyzing the list of attributes to identify the attribute as one of the one or more attributes.

19. The method of claim 17, wherein the attribute is used to refine a queue of music tracks, the method further comprising:

determining an active play queue of music configured to play using the computing device;

identifying music included in the active play queue of music associated with the attribute; and removing music from the active play queue of music that is not associated with the attribute.

20. The method of claim 17, further comprising:
receiving additional audio input from the computing device;
analyzing the additional audio input to identify an additional attribute; and
analyzing the subset of media content using the additional attribute to determine one or more media content to be played using the computing device.

\* \* \* \* \*